Jan. 3, 1933.  G. GUERRI  1,893,410
METHOD OF AND MEANS FOR RAISING AND LOWERING TRACTOR DRAWN IMPLEMENTS
Filed Sept. 10, 1931  2 Sheets-Sheet 2

Inventor:
Giuseppe Guerri
By Williams, Bradbury, McCaleb
& Hinkle, Attys.

Patented Jan. 3, 1933

1,893,410

UNITED STATES PATENT OFFICE

GIUSEPPE GUERRI, OF JESI, ANCONA, ITALY

METHOD OF AND MEANS FOR RAISING AND LOWERING TRACTOR DRAWN IMPLEMENTS

Application filed September 10, 1931, Serial No. 562,098, and in Italy September 10, 1930.

This invention relates to a method of and means for raising and lowering tractor drawn implements, particularly plows, and has as its purpose to provide such a method and means which will accomplish such raising and lowering in the most suitable manner.

One of the main objects of the invention is to provide a method of and means for raising a tractor drawn plow off the ground in such a manner that the plow share or shares will be withdrawn from the furrow by a tilting movement, so that the clods on the plow share or shares will be dumped rather than lifted up, or else the plow share or shares will be pulled out from under the clods without the need to overcome the resistance of the latter to its upward movement.

Another important object of this invention is to provide a method of and means for lowering tractor drawn implements from a raised position to the ground in a gentle and easy manner rather than by abrupt and jarring movement as is the case in the devices heretofore known.

Other objects of the invention reside in the particular construction and combination of parts of the device for carrying out the invention which make its operation simple, effective, positive and unfailing.

One preferred form of embodiment of the invention is illustrated in the accompanying drawings in which.

Figure 1:
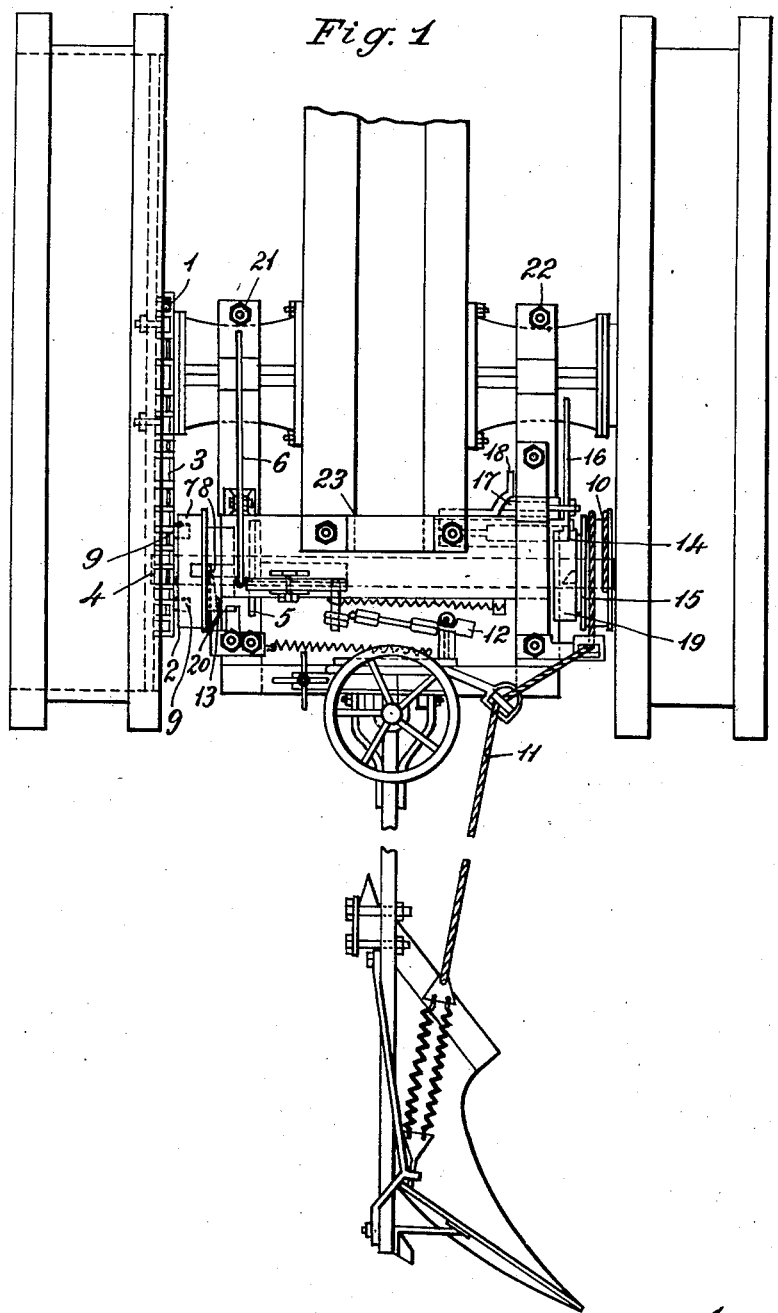
Figure 1 is a partly fractional plan view of a tractor portion and a single plow attached to the same with the means for raising and lowering according to this invention.
Figure 2:
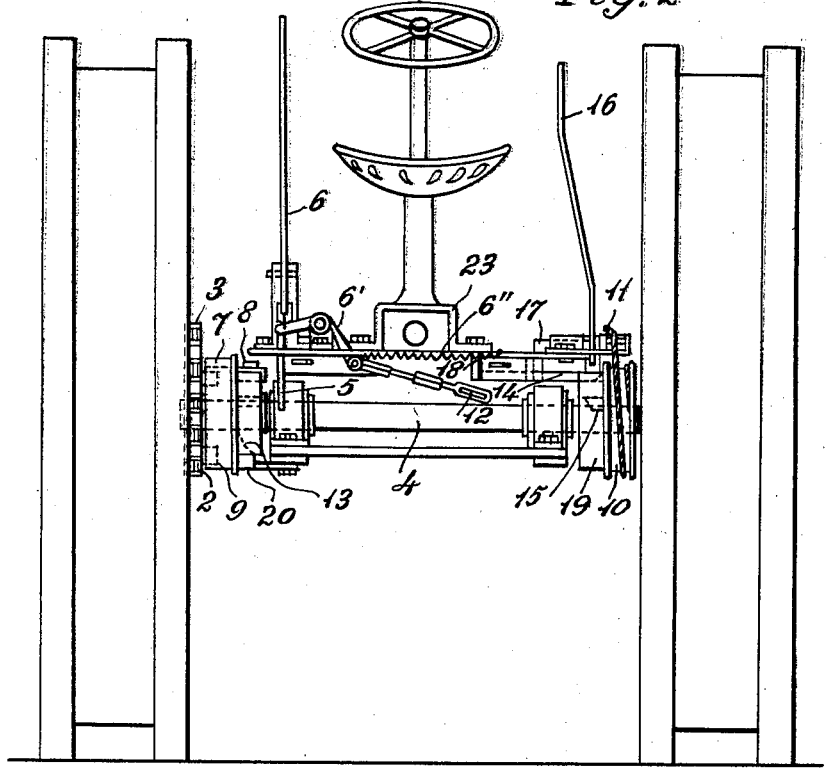
Figure 2 is a rear view of the same, omitting the plow.

Referring more particularly to the drawings, a sprocket wheel 1 secured to one rear wheel of the tractor about the axle of the same drives a sprocket chain 2 and thereby another sprocket wheel 3 rotatably mounted on a shaft 4 which also carries slidably but non-rotatably mounted thereon a clutch 7 and a similarly mounted coupling member 8.

A lever 6 suitably pivoted to the tractor frame is adapted to act upon a bell crank lever 6', in opposition to a spring 6'', and a slidable plate 5 to move the coupling member 8 into engagement with the clutch 7 and the latter into engagement with lateral projections 9 of the sprocket wheel 3, thus causing the shaft 4 to rotate in unison with the tractor wheel.

A winch drum 10 is rigidly mounted on the opposite end of the shaft 4 and adapted to wind up a cable 11 which serves for the raising and lowering of the plow.

The control lever 6, adapted to be operated by the driver of the tractor from his seat, is also connected by means of the bell crank lever 6' and a chain to a trip 12, which is adapted to disengage the plow beam from its mounting in the drawbar of the tractor in such a manner that the plow beam may tilt or rotate around its longitudinal axis under the action of the furrow upon the plow share when the plow is pulled upwardly by the cable 11, as may readily be understood. This will allow the previously described tilting movement of the plow share by means of which it is freed from the clods resting upon it and be withdrawn from the furrow without great effort.

The winch drum 10 is so dimensioned that a partial rotation of it, e. g. a quarter revolution, will be sufficient to raise the plow off the ground. As soon as this is done, a wedge 13 mounted on the tractor frame disengages the coupling member 8 and therewith the clutch 7 from the projections 9 of the sprocket wheel 3, so that the shaft 4 will not be driven any more and thereby the rotation of the winch drum 10 and the raising of the plow will cease. A spring controlled pawl 14 mounted on the tractor frame in engagement with internal teeth 15 provided in the winch drum 10 prevents the latter from rotation in the opposite direction and thereby retains the plow in the raised position.

To lower the plow, a second control lever 16, also operable by the driver from his seat, is mounted in the tractor frame and provided with an arm 17 adapted to push a slidable latch 18 which is connected to the pawl 14 and to disengage the same from the teeth 15 of the drum 10, allowing the latter to rotate backwards under the action of the weight of the plow.

Figure 3:
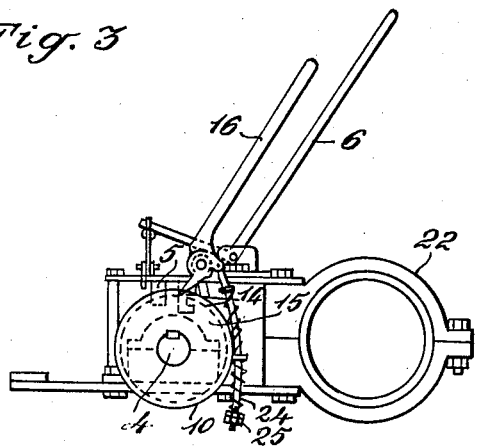
Figure 3 is a side view of a portion of the device shown in Figures 1 and 2.

In order to avoid that the plow should then descend abruptly to the ground, a band brake 19 is provided on the drum 10, also operated by the control lever 16 (see Figure 3) simultaneously with the latch 18 so that the minute the latter causes the drum to be released by the pawl 14, the band brake 19 is tightened and allows the drum to lower the plow only gradually in proportion to the pressure exerted by the driver on the control lever 16.

Upon release of the lever 16 by the driver, a double spring 24, the tension of which may be regulated by adjusting nuts 25, causes the band brake 19 to disengage from the drum 10.

The wedge 13 is also provided with an oppositely inclined surface 20 which will cause the coupling member 8 to disengage the clutch 7 from the projections 9 when the tractor is run backwards while the clutch 7 is in engagement with the sprocket wheel 3.

In the example of embodiment of the invention shown in the drawings, the above described mechanism is mounted on the rear bridge of the tractor by means of a pair of clamps 21, 22 connected by a stirrup 23 secured to the rear end of the chassis. It will be seen from this that the mechanism for raising and lowering the plow may be attached to any known construction of tractor without requiring any alterations in the latter.

The plow beam is secured to the drawbar of the tractor in the usual way with means for regulating the depth of furrow, the angle of plowing and the transversal distance between the tractor wheels.

It will be understood that while I have thus described and illustrated one preferred form of embodiment of my invention, I do not wish to be limited to the mechanical details thereof, but may resort to such modifications and alterations as come within the scope of the claims hereunto appended.

I claim:

1. In a device for the raising and lowering of a tractor-drawn implement, comprising, in combination with said tractor and implement, means for raising said implement to a predetermined level above the ground,—a driving element secured to a tractor wheel adapted to be brought into operative engagement with said raising means so as to actuate the same when the tractor is moving forward, and automatic means for disengaging said driving element from said raising means when the tractor is moving backward.

2. A device for the raising and lowering of a tractor-drawn implement, comprising, in combination, a driving element carried by the tractor wheel, a shaft adapted to be coupled to said driving element and to be driven thereby, a winch rigidly carried by said shaft, flexible means adapted to be wound on said winch and secured to said implement so as to raise the same off the ground when the tractor is moving forward and the winch shaft is coupled to said driving element, means for permitting said implement to tilt about its longitudinal axis when lifted by said flexible means, means for automatically uncoupling said shaft from said driving element when the implement has been raised to a predetermined level, automatic means for arresting said winch in such position, operator-controlled means for releasing said arresting means so as to allow the implement to descend to the ground by gravity and a brake for said winch adapted to slow down its movement, said brake being actuated by the same above said operator-controlled means simultaneously with the release of said arresting means, substantially as set forth.

In testimony whereof I have signed my name to this specification.

GIUSEPPE GUERRI.